United States Patent [19]

Pfeiffer et al.

[11] Patent Number: 4,795,191
[45] Date of Patent: Jan. 3, 1989

[54] DEVICE FOR AUTOMATICALLY ADJUSTING AND LOCKING THE HEIGHT OF A DEFLECTION FITTING OF A SAFETY BELT IN VEHICLES

[75] Inventors: Klaus Pfeiffer, Aidlingen; Andreas Pieper, Bodenheim; Hans-Jürgen Scholz, Waldenbuch; Walter Jahn, Ehningen; Jürgen Gimbel, Gechingen, all of Fed. Rep. of Germany

[73] Assignee: Daimler-Benz Aktiengesellschaft, Stuttgart, Fed. Rep. of Germany

[21] Appl. No.: 161,106

[22] Filed: Feb. 26, 1988

[30] Foreign Application Priority Data

Feb. 27, 1987 [DE] Fed. Rep. of Germany ....... 3706367

[51] Int. Cl.⁴ .................................... B60R 21/10
[52] U.S. Cl. ............................. 280/808; 280/806
[58] Field of Search .............. 280/801, 805, 806, 808; 297/483

[56] References Cited

U.S. PATENT DOCUMENTS 4,564,219  1/1986  Broden et al. .................. 280/808
4,652,012  3/1987  Biller et al. .................... 280/808

FOREIGN PATENT DOCUMENTS 0067968  12/1982  European Pat. Off. .
2651037   5/1978  Fed. Rep. of Germany .
2655015   6/1978  Fed. Rep. of Germany .
2720789  11/1978  Fed. Rep. of Germany ...... 280/808
3541179   5/1987  Fed. Rep. of Germany ...... 280/808

Primary Examiner—David M. Mitchell
Assistant Examiner—Ross Weaver
Attorney, Agent, or Firm—Barnes & Thornburg

[57] ABSTRACT

A device for automatically adjusting the height of the deflection fitting of a safety belt in vehicles having an anchoring element which carries the deflection fitting and is vertically displaceable in a guide rail firmly attached to the vehicle which includes an adjusting mechanism for displacing and holding the anchoring element in the vertical position set and has a locking device which is effective in the case of extreme vehicle deceleration to be connected to a vehicle deceleration sensor for locking the anchoring element in the guide rail by transverse displacement of a locking element, coupled to the anchoring element, due to the downward movement of the anchoring element caused by the deflection fitting.

11 Claims, 2 Drawing Sheets

Fig. 1
Fig. 2
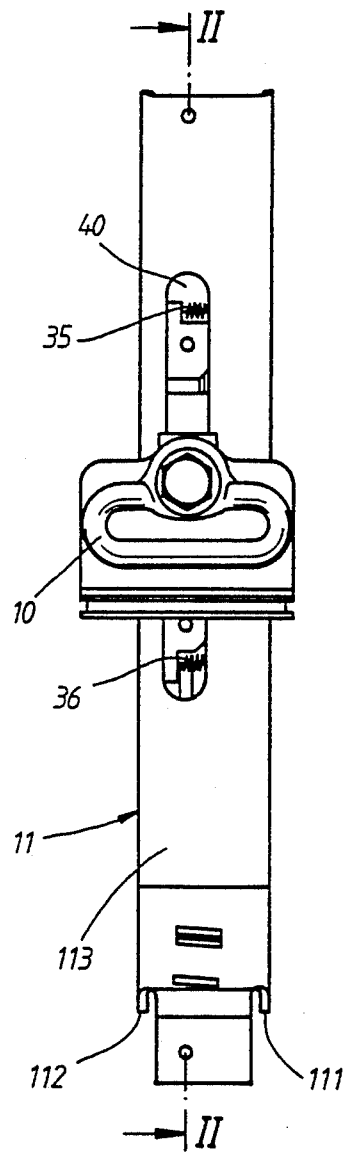
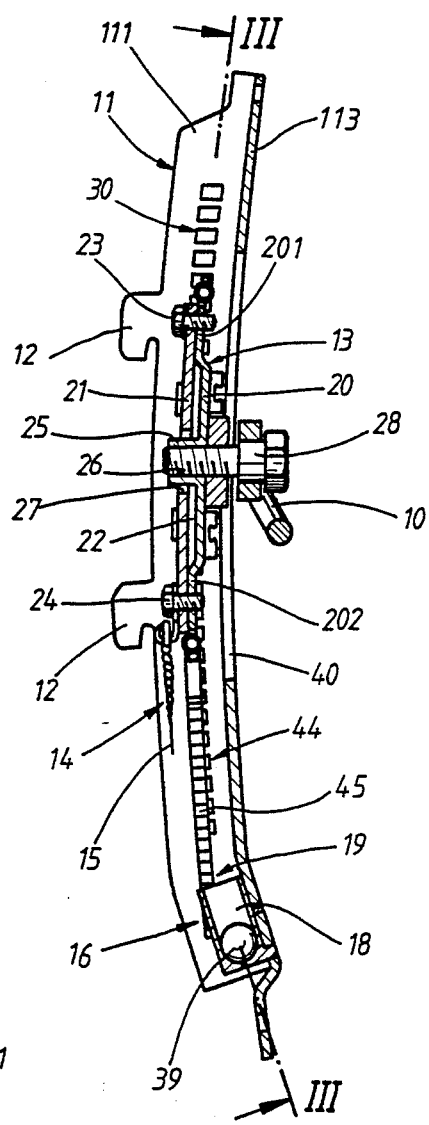

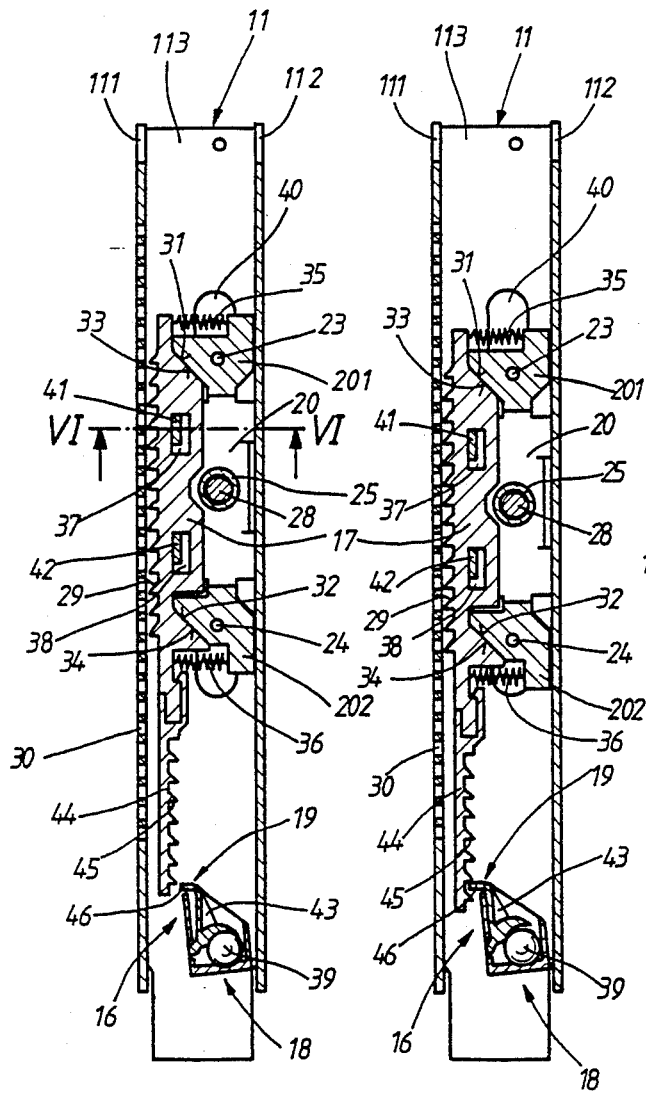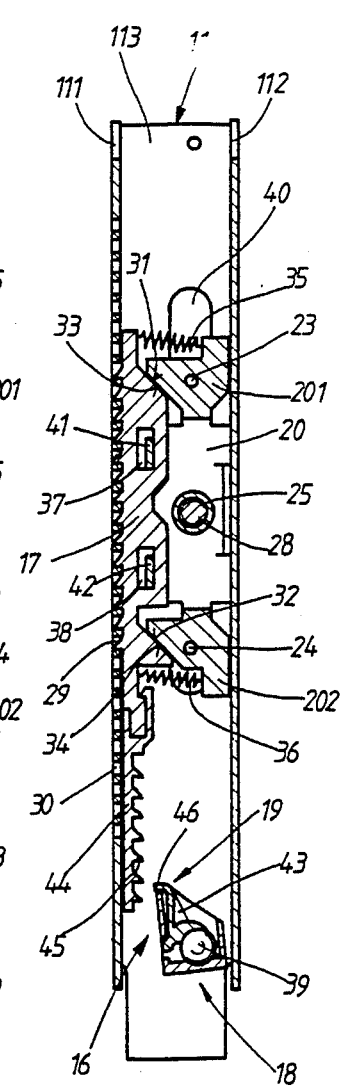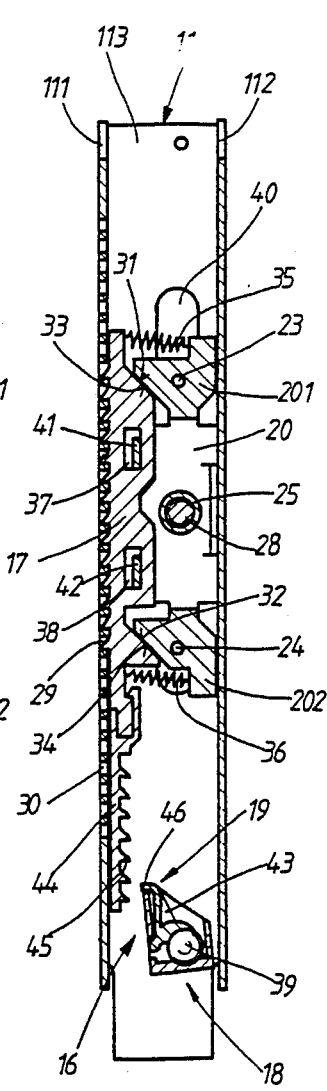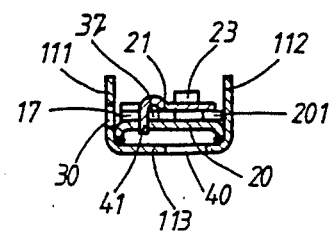

DEVICE FOR AUTOMATICALLY ADJUSTING AND LOCKING THE HEIGHT OF A DEFLECTION FITTING OF A SAFETY BELT IN VEHICLES

BACKGROUND AND SUMMARY OF THE INVENTION

The invention relates to a device for automatically adjusting the height of the deflection fitting of a safety belt in vehicles, in particular motor vehicles having a vertical guide rail attached to the vehicle body and an anchoring element which guidingly carries the deflection fitting in a vertically displaceable manner in the guide rail, and wherein the adjusting mechanism is displaceable for holding the anchoring element in a set vertical position and wherein a locking device is effective in the case of extreme vehicle deceleration for locking the anchoring element at the guide rail. The locking element can be displaced transversely to the vertical displacement direction of the anchoring element, and is coupled to the anchoring element and has a row of locking teeth capable of being pushed into a corresponding row of holes in the guide rail by means of a downward movement relative thereto of the anchoring element.

Devices of this kind, by means of which the deflection fitting of the safety belt can be adjusted in height via the adjusting mechanism as a function of the position of a vehicle seat, serve to adjust the upper anchoring point of the safety belt automatically to the particular size of the user of the seat. In this context, the deflection fitting is held in a particular set vertical position by the adjusting mechanism, which can be designed using a Bowden cable or a push-pull element connected to the seat, but is not fixed in this position. In order to prevent an undesirable displacement, or loading of the deflection fitting on the adjusting mechanism, which cannot take such loading during the event of sharp braking, or of vehicle collision, the locking device locks the deflection fitting directly to the guide rail and thus to the vehicle body.

In German Offenlegungsschrift 2,655,015, the anchoring element and the locking element are arranged in a large volume recess on a slide which slides in the guide rail. Extending at approximately 45° to its displacement direction, the anchoring element has a wedge surface against which the locking element rests by an identical wedge surface under the action of a lifting spring attached to the locking element and supported on that side of the guide rail which carries a row of locking holes. The adjusting mechanism engages the slide in the displacement direction of the latter. As soon as a force, which exceeds the tensile force exerted on the belt by the user of the belt during normal driving, is exerted on the belt, the force exerted on the wedge surface of the locking element by the anchoring element connected to the deflection fitting via the wedge surface of the anchoring becomes greater than a spring force of a lifting spring. The lifting spring is compressed and the locking element is displaced towards the row of holes in the guide rail until the row of locking teeth engages the row of holes. The anchoring element is thus directly fixed via the locking element to the guide rail and thus to the car body and all the tensile forces exerted on the belt are directed into the car body via the deflection fitting. Alteration of the vertical position of the deflection fitting is not possible, nor is loading of the adjusting mechanism.

However, a precondition for the satisfactory functioning of this known device is that the adjusting mechanism should resist the downward movement of the slide at the moment when downwardly directed tensile forces are exerted on the deflection fitting and thus on the anchoring element and this resistance must be greater than the spring force of the lifting spring. If this is not the case, the slide is displaced downwards by the anchoring element via the locking element and a transverse movement of the locking element against the force of the lifting spring does not occur. Although such matching of the locking mechanism and the lifting spring can be achieved, the reliability of the device in the long term cannot be guaranteed. Moreover, the functioning of the device depends on the secure locking of the seat to the floor of the vehicle. If this is not guaranteed, the slide is displaced with the seat and the locking device cannot become operative. It is then not possible to prevent the deflection fitting from slipping, with the disadvantage consequences for the user of the belt.

An object on which the invention is based is to provide a device of the type above-mentioned wherein the locking mechanism functions reliably long term and uninfluenced by faults elsewhere in the belt system, such as, for example, on an unlocked vehicle seat, and thus offers the user of the belt effective protection from injury at all times.

According to the invention, an object thereof is achieved by automatically adjusting the height of the deflection fitting of a safety belt having a vertical guide rail attached to the vehicle body and an anchoring element which guidingly carries the deflection fitting in a vertically displaceable manner in the guide rail, and wherein the adjusting mechanism is displaceable for holding the anchoring element in a set vertical position and wherein a locking device is effective in the case of extreme vehicle deceleration for locking the anchoring element at the guide rail. The locking element can be displaced transversely to the vertical displacement direction of the anchoring element, and is coupled to the anchoring element and has a row of locking teeth capable of being pushed into a corresponding row of holes in the guide rail by means of a downward movement relative thereto of the anchoring element. The adjusting mechanism acts directly on the anchoring element by having a deceleration sensor interact with the locking element in such a way that when a predetermined vehicle deceleration value is exceeded it blocks a downward movement of the locking element at least temporarily.

The sensor, which detects sharp braking or a collision of the vehicle, prevents the downward movement of the locking element, caused by increased belt loading, independently of the adjusting mechanism. With the locking element blocked from downward movement, the locking element is displaced sidewards by the continuing downward movement of the anchoring element caused by belt loading, so that a row of locking teeth enters a row of holes in the guide rail very rapidly and reliably. The entry of the row of locking teeth is thereby positively controlled. Sensors for detecting deceleration have long been used in vehicles for various protection devices and operate very reliably. The locking device functions even when the seat is loose, so that in this case, in the event of a possible crash, the seat and the passenger are restrained by the safety belt.

An advantageous embodiment of the invention is to prevent a part of the locking force being directed into the sensor and there causing function-impairing damage. By having the deceleration sensor act on the locking element so that as the row of locking teeth on the locking element begins to engage the row of holes in the guide rail, the connection between sensor and locking element is cancelled and thus this prevents a part of the locking force being directed into the sensors, and thus causing a function impairing damage.

A further advantage is obtained by the deceleration sensor being arranged on the guide rail with a ball which shifts when the vehicle deceleration exceeds the predetermined value and including a swivellably mounted swivelling lever with locking nose, and wherein a control member, which carries a toothed strip which projects into the swivelling region of the swivelling lever, interacts with the locking nose of the swivelling lever to limit its down movement.

Another advantageous embodiment of the invention is obtained by having the tooth spacing of the toothed strip and the tooth spacing of the row of locking teeth of equal magnitude and with the swivelling lever arranged such that when the locking teeth and the row of holes are located opposite one another, the locking nose can fall into a gap between the teeth of the toothed strip. This ensures that when the locking element is blocked by the sensor, the teeth of the row of locking teeth are aligned exactly with the holes in the row of holes and can thus enter the latter unhindered by means of transverse displacement of the locking element.

A further advantage is obtained by having the control member rigidly connected to the locking element in such a way that it takes part in the latter's displacement movement transverse to the displacement direction of the anchoring element and in that the swivelling lever and the control element are arranged in such a manner with respect to one another that during a displacement movement of the locking element prior to locking teeth fully engaging the row of holes, the toothed strip is transversely displaced by a distance which releases the locking nose.

Another advantage is obtained by having the anchoring element formed with a base plate, which is laterally guided in a U-shaped guide rail, and a cover plate firmly connected to the base plate while leaving an intermediate space therebetween for a flat locking element to be held in a transversely displaceable manner. Locking teeth are arranged along a lateral edge of the locking element and cooperating holes are arranged in an arm of the U-shaped guide rail. Also, the base plate is bent towards the cover plate in the displacement direction, above and below the locking element in the plane of the locking element, and has a bevel surface which extends at an acute angle to the longitudinal axis of the plate in the downward displacement direction to form a sliding surface. A tension spring mechanism engages on the locking element and on the base plate and against a sliding surface, formed by a second bevel surface on the locking element, to bias the locking element open. The cover plate has at least one nose which projects towards the locking element and protrudes through a locking element opening, which edges limit the displacement movement of the locking element transverse to the displacement direction of the base and cover plate.

Other edges of the opening in the locking element cooperate with noses on the cover plate to carry the locking element with the base and cover plate during vertical movement.

Still another advantage lies in having the deflection fitting secured to a screw bolt on the base plate, which bolt protrudes through a longitudinal slot which extends through a web of the U-shaped guide rail over the displacement range of the base and cover plate.

These and other objects, features, and advantages of the present invention will become more apparent from the following description when taken in connection with the accompanying drawings which show, for the purposes of illustration only, one embodiment in accordance with the present invention, and wherein:

BRIEF DESCRIPTION OF THE DRAWINGS

FIG. 1 is a plan view of a device for automatically adjusting the height of the deflection fitting of a safety belt;

FIG. 2 is a sectional view of the line II—II in FIG. 1;

FIGS. 3–5 show a sectional view along the line III—III in FIG. 2 in three various instantaneous positions during the locking sequence; and FIG. 6 is a section along the line VI—VI in FIG. 3.

DETAILED DESCRIPTION OF THE DRAWINGS

Referring now to the drawings wherein like reference numerals are used to designate like parts and more particularly to FIG. 1.

A device is illustrated for automatically adjusting the height of a deflection fitting 1 for a safety belt along a guide rail 11 which has a U-shaped cross-sectional profile defined by a web 113 and arms 111 and 112 integral therewith. Each arm 111, 112 has two hooks 12, which project outwardly in the plane of the arms and by means of which the guide rail 11 can be attached at the central pillar of a car body. When attached, the web 113 of the guide rail 11 faces the interior of the vehicle and the arms 111, 112 extend toward the outside of the vehicle. An anchoring element 13 supports the deflection fitting 10 and is guided so as to be vertically displaceable along the length of guide rail 11. The anchoring element 13 is vertically displaceable in the guide rail 11 by means of an adjusting mechanism 14 and can be fixedly held in any vertical position to which it is set. FIG. 2 shows the end of a push-pull element 15 of the adjusting mechanism 14. This push-pull element 15 connects the anchoring element 13 to a vehicle seat, as shown and described in German Offenlegungsschrift 2,651,037. The push-pull element is a "Bowden" type cable, a cable which is guided inside a sleeve (not shown) and is subjected to a tension force when the vehicle seat (not shown) is shifted forward in the driving direction of the vehicle to pull the anchoring element 13 downwards via the push-pull element 15.

Since the adjustment mechanism 14 is not capable of accepting forces directed on the deflection fitting 10 by the safety belt during braking or a vehicle collision, a locking device 16 is provided via which in such cases immediately locks the anchoring element 13 to the guide rail 11. Thus, the forces exerted on the deflection fitting 10 are directed into the vehicle body via the anchoring element 13 and the guide rail 11 without loading the adjusting mechanism 14. Displacement of the deflection fitting 10 downwards and the associated danger to the user of the belt is thereby prevented. Broadly, the locking device 16 has a locking element 17 and a sensor 18 which detects a vehicle deceleration.

The sensor 18 acts on the locking element 17 via a coupling subassembly 19 in a manner such that when a predetermined value for the vehicle deceleration is exceeded, the locking element 17 is blocked in the vertical direction so that it cannot execute a downward movement as will be explained in detail later on.

The anchoring element 13 carrying the deflection fitting 10 comprises: a base plate 20 and a cover plate 21 (FIG. 2), which plates are firmly connected to each other at top and bottom regions 201 and 202, while leaving an intermediate space 22 between the plates along their length. The intermediate space 22 serves to accommodate, in a lateral displaceable manner, the flat locking element 17. The locking element 17 is displaceable transversely to the displacement direction of the anchoring element 13 and toward arm 111 of the rail 11. To obtain the intermediate space 22, the base plate 20 is bent toward the cover plate 21 near its ends (FIG. 2). Above and below the locking element 17, the ends of the base plate lie in the plane of the locking element 17. In this region, the base plate 20 and cover plate 21 are in each case screwed to one another by bolts 23 and 24 respectively. As can be seen from FIG. 6, the base plate 20 is guided in a longitudinally displaceable manner in the U-shaped guide rail 11. As can be seen from FIG. 2, the base Plate 20 has a hollow socket 25 with internal threads 26 which projects approximately centrally. The socket 25 protrudes through a perforation 27 in the cover plate 21. A bolt 28 is screwed into the internal thread 26 and the deflection fitting 10 is swivellably held on the bolt 28. The bolt 28 also protrudes through a longitudinal slot 40 in the web 113 of the guide rail 11, which longitudinal slot extends over the displacement range of the anchoring element 13 made up of the base plate 20 and the cover plate 21. By attaching the Bowden cable 15 to the cover plate 21 about the bolt 24, the adjusting mechanism 14 acts directly on the anchoring element 13 supporting the deflection fitting 10.

The flat locking element 17 is transversely displaceable with respect to the base plate 20 and the cover plate 21 in the intermediate space 22 between the latter in a direction toward and away from arm 111 of arm 11. The locking element 17 has a row of locking teeth 29 located immediately opposite a row of holes 30 in the arm 111 of the guide rail 11. By transverse displacement of the locking element 17 toward the arm 111, this row of locking teeth 29 is able to engage the row of holes 30 to secure the locking element 17 to the guide rail 11. In the two end regions 201 and 202 are located beyond the bends and in the plane of the locking element 17. The base plate 20 is formed with upper and lower bevel edges 31 and 32 which face toward the row of holes 30 and extend vertical downward toward the floor of the vehicle to form an acute angle of approximately 45°. These bevels 31, 32 form sliding surfaces by means of which the base plate 20 rests on cooperating bevels 33, 34 on the locking element 17. The pairwise contact of the bevels 31, 33 and 32, 34 is achieved by means of two tension springs 35, 36 which extend between the locking element 17 on the base plate 20 and transverse to tee displacement direction of the base plate 20 and the locking element 17. In addition, the locking element 17 has two rectangular openings 37, 38 (upper and lower) through which two noses 41, 42 on the cover plate 21 project towards the base plate 20 (FIGS. 3 and 6). The nose 41, 42, cooperate with the long vertically extending walls of the openings 37, 38 to form limits for the displacement movement of the locking element 17 toward and away from the row of holes 36. The upper and lower short horizontal walls of the openings 37, 38 cooperate with the noses 41, 42 to carry the locking element 17 along in the direction of vertical adjustment.

The sensor 18 of the locking device 16 is designed as a ball sensor in the well known manner, and is arranged on the guide rail 11 outside the displacement range of the anchoring element 13 and locking element 17. The sensor has a ball 39 which is displaced when a predetermined vehicle deceleration is exceeded. This displacement actuates a swivelling lever 43 of a coupling subassembly 19 which connects the sensor 18 to the locking element 17. The coupling subassembly 19 includes a control member 44, which is rigidly connected to the locking element 17 and contains a toothed strip 45 which projects downwardly into the swivelling region of the swivelling lever 43. The swivelling lever 43 is provided with a locking nose 46 which is capable of engaging the toothed strip 45 when the swivelling lever 43 swivels as caused by the shifting of ball 39. The tooth spacing of the toothed strip 45 corresponds to the tooth spacing of the row of locking teeth 29. In addition, the swivelling lever 43 is arranged such that when the row of locking teeth 29 are located directly opposite the holes in the row of holes 30, the locking nose 46 can fall unhindered into a gap between two teeth on the toothed strip 45. At the same time, the design and arrangement of the swivelling lever 43 ensures that when the locking element 17 performs the required transverse movement to lock the row of locking teeth 29 of the locking element 17 into the row of holes 30 in the guide rail 11, the locking nose 46 is lifted out of the toothed strip 45, thereby ensuring that none of the locking force between the teeth 29 and the holes 30 is directed into the ball sensor.

The mode of operation of the locking device 16 for fixing the deflection fitting 10 at the guide rail 11 in the event of extreme vehicle deceleration, e.g., as a result of emergency braking or a collision, can be clearly seen from FIGS. 3-5.

FIG. 3 shows the device during normal driving. The deflection fitting 10, of which only the fixing bolt 28 can be seen in FIGS. 3-5, assumes an arbitrary vertical position.

In the event of extreme vehicle deceleration, the ball 39 of the sensor 18 is deflected (FIG. 4). The ball 39 swivels the swivelling lever 43, whose locking nose 46 falls into the toothed strip 45 and stops the control member 44 from movement in the downward direction. The trapped-in user on the vehicle seat lurches against the safety belt, thereby causing the deflection fitting 10 and with this, the anchoring element 13 comprising the base plate 20 and the cover plate 21 to move downwards. The downward movement of the base plate 20 is communicated to the locking element 17 via the cooperating bevels 31, 33 and 32, 34. Since, however, the control member 44 is prevented from moving downward by the swivelling lever 43, the cooperating bevels 31, 33 and 32, 34 convert the downward movement of the base plate 20 into a displacement movement, transverse thereto, of the locking element 17, thereby causing the row of locking teeth 29 to move towards the row of holes 30 in the arm 111 of the guide rail 11 (FIG. 4) and finally to penetrate into the row of holes (FIG. 5). By the time the tooth tips of the row of locking teeth 29 are projecting into the row of holes 30, the control member 44, due to the displacement movement of the locking element 17, has also moved away from the swivelling lever 43 to the extent that the locking nose 46 is now out of engagement with the toothed strip 45. In the further downward movement of the base plate 20, the teeth of the row of locking teeth 29 are pushed deeper into the holes in the row of holes 30, until the displacement movement of the locking element 17 is blocked by the noses 41, 42 on the cover plate 21 (FIG. 5). The deflection fitting 10 is thus locked to the guide rail 11 and hence to the vehicle body by the base plate and cover plate 20, 21 and by the locking element 17. The adjusting mechanism 14 and also the sensor 18 remain free of forces so that no damage can occur at these points.

While we have shown and described only on embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by a the scope of the appended claims.

What is claimed:

1. An adjustment and locking mechanism for the deflection fitting of a safety belt in vehicles comprising:
   a vertical guide rail attached to a vehicle body;
   an anchoring means carrying a deflection fitting and being guided in a vertically displaceable manner at said guide rail;
   an adjusting means for displacing and holding said anchoring means in a set vertical position;
   a locking means effective in the case of extreme vehicle deceleration for locking said anchoring means at said guide rail;
   a locking element means displaceable transversely to the displacement direction of the anchoring means and being coupled to the anchoring means;
   said locking element having locking teeth cooperating with holes in the guide rail in response to a vertical downward movement relative thereto of the anchoring means;
   wherein the adjusting means acts directly on the anchoring means to position the anchoring means in a set position; and wherein
   a vehicle deceleration sensor acts on the locking element means when a predetermined vehicle deceleration value is exceeded for blocking a downward movement of the locking means at least temporarily.

2. An adjustment and locking mechanism according to claim 1, wherein said deceleration sensor that blocks downward movement of said locking element means also has a mechanical coupling means, which when said locking teeth on said locking element means begins to engage said holes in said guide rail, the mechanical coupling means between the deceleration sensor and locking element means is disconnected.

3. An adjustment and locking mechanism according to claim 2, wherein said deceleration sensor is arranged on said guide rail and has a ball which shifts when the vehicle deceleration exceeds a predetermined value and wherein said coupling means has a swivellably mounted swivelling lever actuated by the ball and has a locking nose;
   and wherein a control member means carries a toothed strip adjacent said swivelling lever which interacts with the locking nose of the swivelling lever.

4. An adjustment and locking mechanism according to claim 3, wherein spacing of teeth on the toothed strip and spacing of said locking teeth are of substantially equal magnitude; and wherein when said locking teeth and said holes are located opposite one another, said swivelling lever can move into a gap between said teeth of said toothed strip.

5. An adjustment and locking mechanism according to claim 3, wherein said tooth strip is rigidly connected to the locking element means to be displaced transverse to said downward displacement direction of the anchoring element when the locking element is displaced transversely, and wherein the swivelling lever and the tooth strip are arranged such that after a transverse displacement movement of the locking element means with said locking teeth engaged into said holes, said toothed strip is transversely displaced by a distance which releases said locking nose.

6. An adjustment and locking mechanism according to claim 1, wherein the anchoring means has a base plate, which is guided in the guide rail, and a cover plate, which is firmly connected to the base plate and rests on the latter while leaving an intermediate space therebetween; and wherein said locking element means is held in a transversely displaceable manner in said intermediate space and said locking teeth are arranged along a lateral edge of the locking element means and said holes are provided in an arm of said guide rail.

7. An adjustment and locking mechanism according to claim 6, wherein said base plate has portions bent towards the cover plate above and below the locking element and regions extending above and below the bent portions which lie in a plane of the locking element; the base plate in at least one of said regions, has a bevel surface which extends at an acute angle to the longitudinal axis of said base plate in the downward displacement direction and forms a sliding surface; and
   wherein tension spring means are provided between said locking element and said base plate for biasing said bevel surface against cooperating surface, formed by an identical parallel bevel surface on said locking element means.

8. An adjustment and locking mechanism according to claim 6, wherein said locking element means has opening means and said cover plate has at least one nose which projects towards the locking element and protrudes through said opening means in the locking element means, and wherein edges of the opening means cooperate with the at least one nose for limiting the displacement movement of the locking element means transverse to the displacement direction of the base and cover plate.

9. An adjustment and locking mechanism according to claim 8, wherein said locking element means is vertically displaceable by a drive between the at least one nose and other edges of said opening means.

10. An adjustment and locking mechanism according to claim 6, wherein said deflection fitting rests in a swivellable manner on a screw bolt, which is screwed into said base plate and protrudes through a longitudinal slot, which extends in a web of said guide rail over the vertical displacement of said base and cover plate.

11. An adjustment and locking mechanism according to claim 6, wherein said adjusting means engages a rear side of said cover plate, which rear side faces away from said base plate.

* * * * *